June 23, 1953  G. W. MACK  2,643,017
PHOTOGRAPHIC SLIDE BINDER
Filed Feb. 18, 1950  5 Sheets-Sheet 2
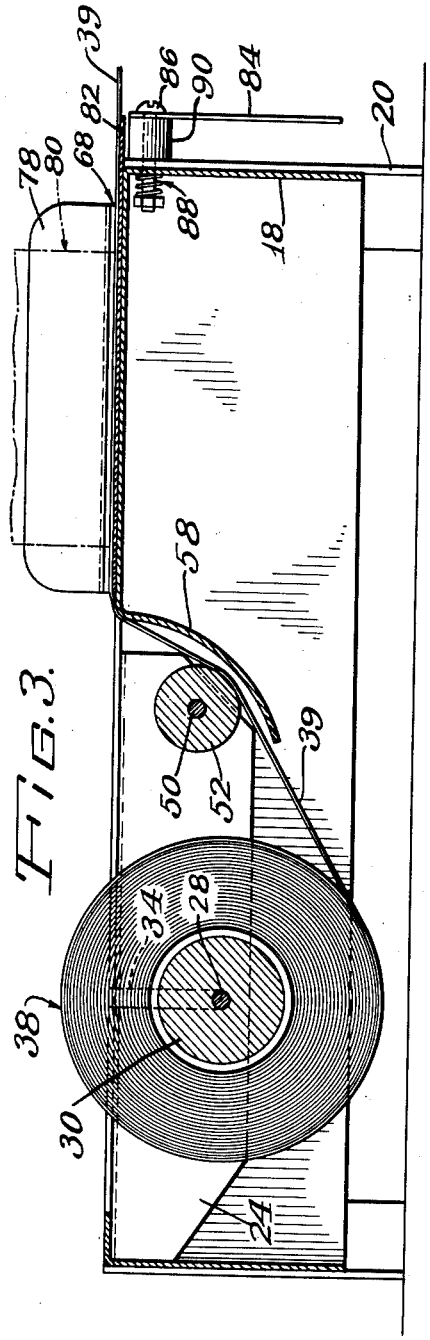
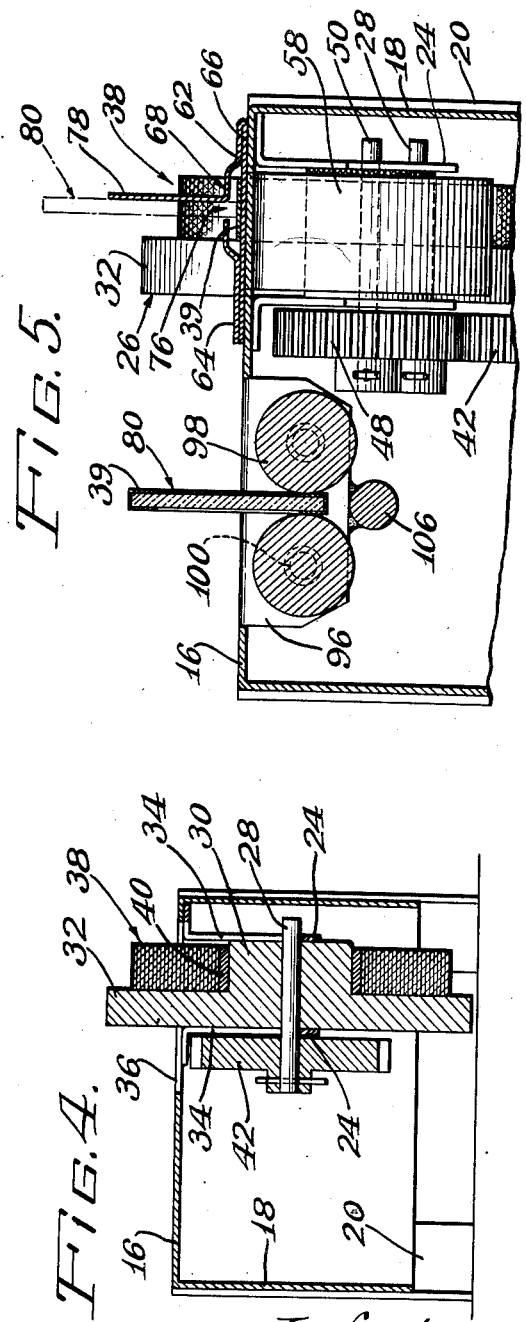
Inventor:
George W. Mack
By Bair, Freeman & Molinare
Attys

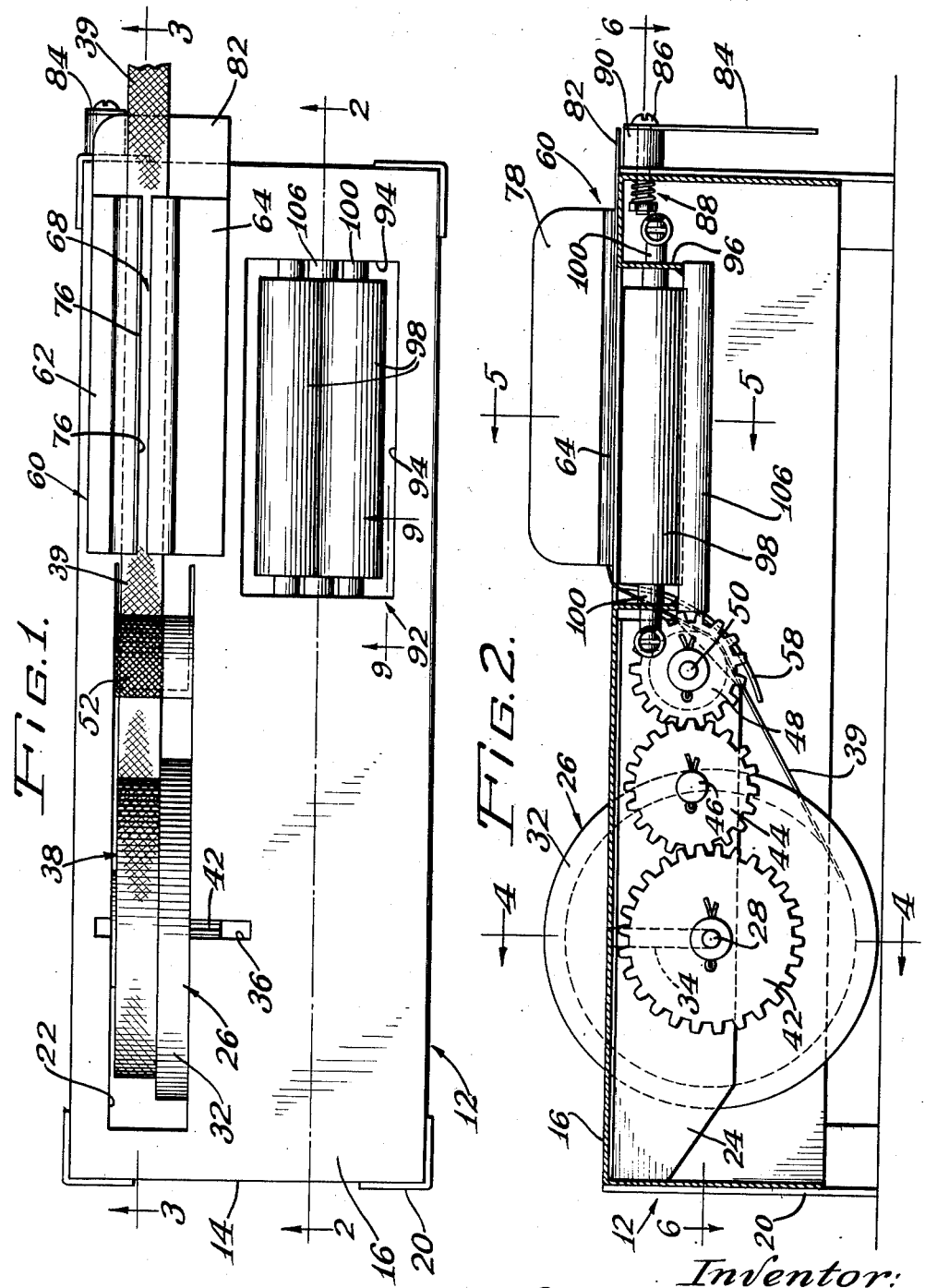

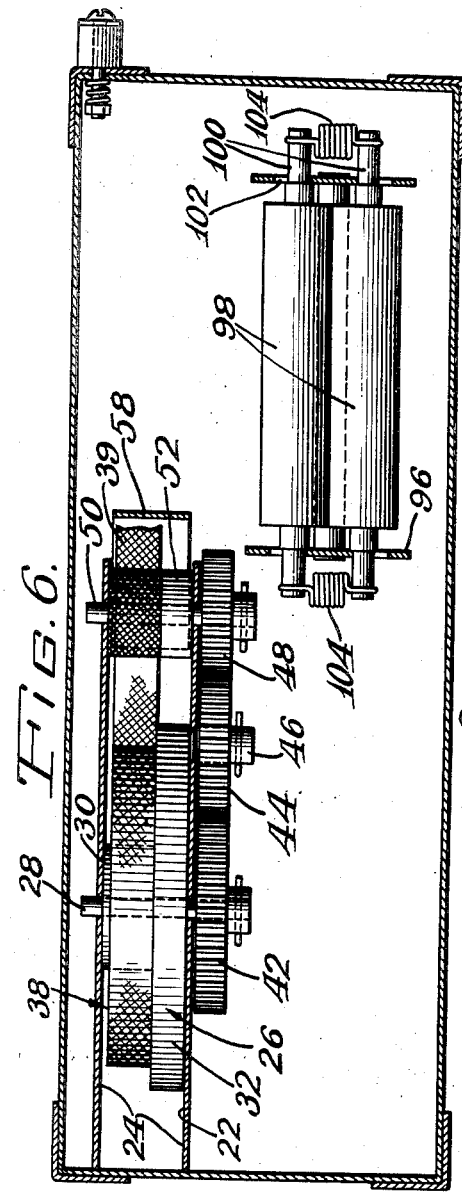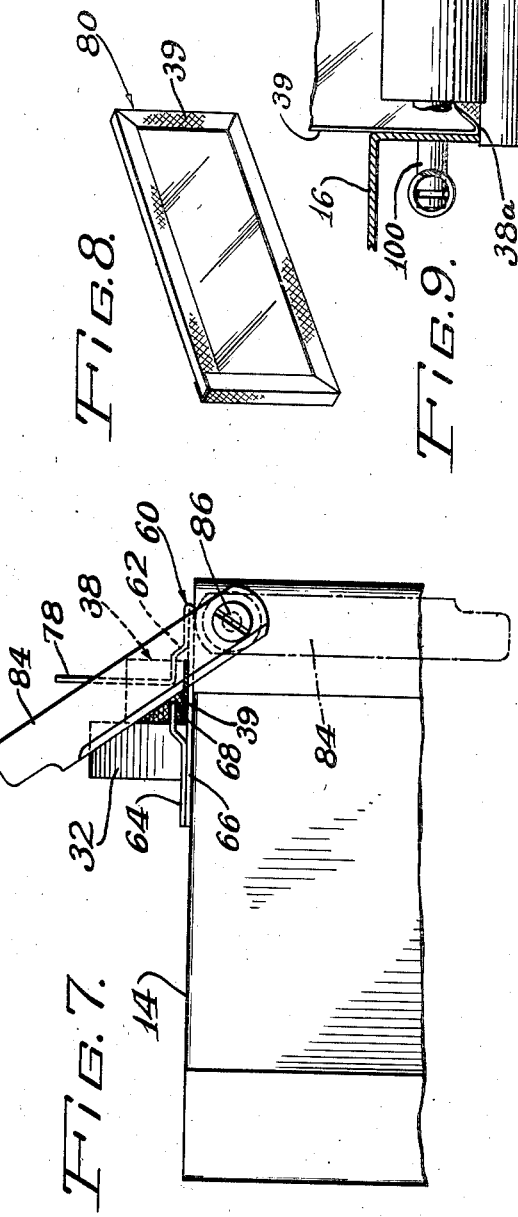

June 23, 1953      G. W. MACK      2,643,017
PHOTOGRAPHIC SLIDE BINDER
Filed Feb. 18, 1950      5 Sheets-Sheet 4
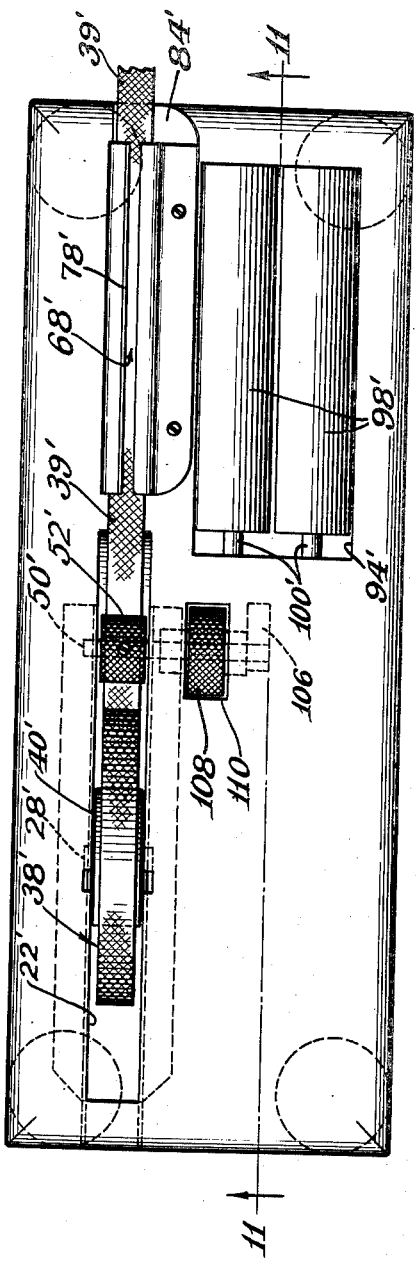
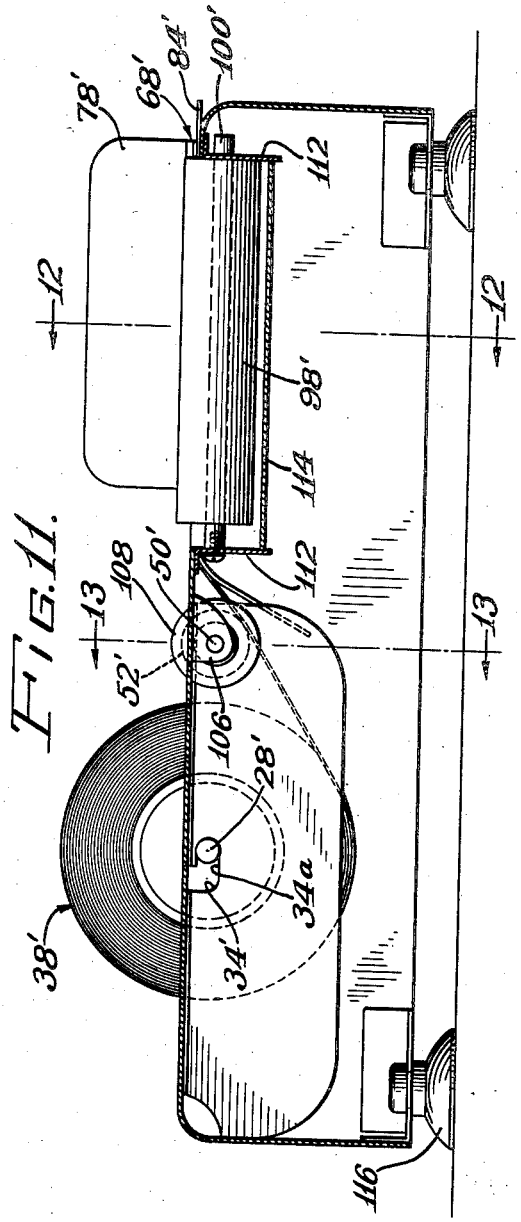
Inventor:
George W. Mack
By Bair, Freeman & Molinare
Attys.

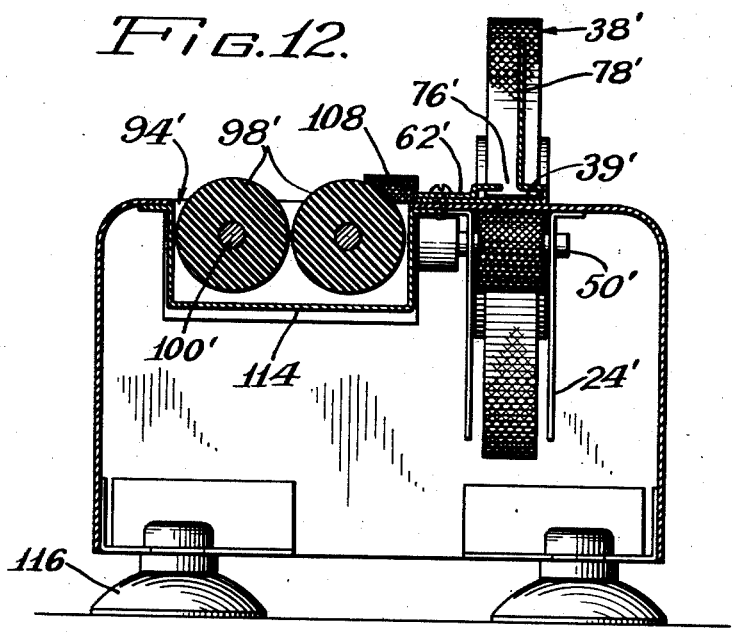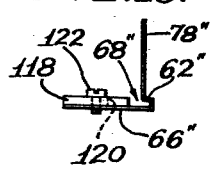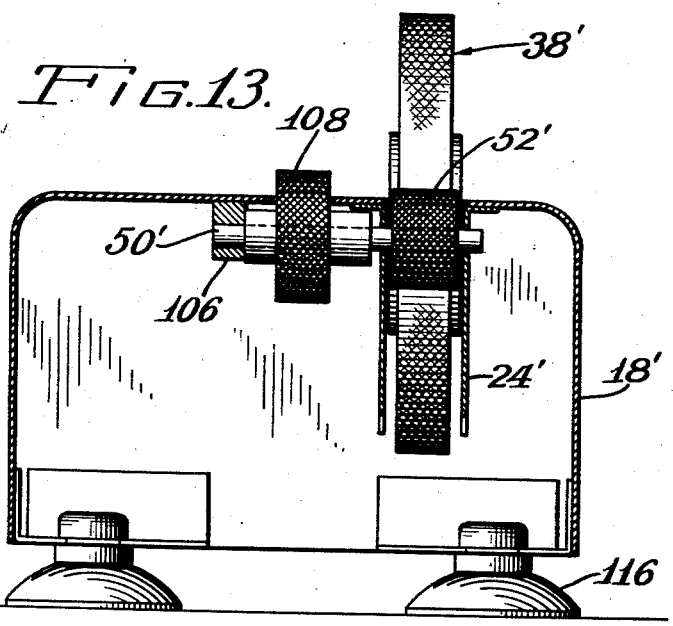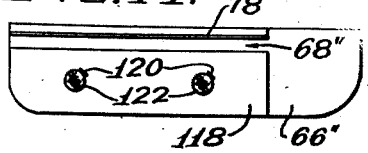

Patented June 23, 1953

2,643,017

UNITED STATES PATENT OFFICE 2,643,017

PHOTOGRAPHIC SLIDE BINDER

George W. Mack, Waterloo, Iowa

Application February 18, 1950, Serial No. 144,926

8 Claims. (Cl. 216—30)

The present device is to be used in connection with applying a binding tape around the marginal edges of a photographic slide.

Photographic slides may be of several types. One is a glass panel on which the picture to be reproduced is imprinted; another is made up of a pair of panels such as cardboards with apertures therethrough in which a photographic film is placed. In either case the slide is bound by tape around the marginal edge.

An object of the present invention is the provision of a novel device for use in applying a binding tape to photographic slides as referred to above.

Another object is the provision of a novel construction device for mounting a roll of adhesive tape and arranged in such a manner that the tape can be applied to the slide in a continuous strip around all of the marginal edges of the slide.

Another object is the provision of a device for mounting a reel of tape and the provision of means for unreeling the tape and feeding it out into a position for impressing the edges of the slide thereon for the purpose of applying the tape to the slide.

Still another object is the provision of a device of the character above referred to for use in applying binding tape to a photographic slide which includes means for folding the edges of the tape into adhesive securement with the side surfaces of the slide in such a manner that at the corners of the slide, the tape is folded over in neat folds.

With these and other objects in view, my invention consists in the construction, arrangement and combination of the various parts of my device whereby the objects contemplated are attained, as hereinafter more fully set forth, pointed out in my claims, and illustrated in the accompanying drawings, wherein:

Figure 1 is a plan view of one form of device of the present invention;

Figure 2 is a longitudinal sectional view taken on line 2—2 of Figure 1;

Figure 3 is a sectional view taken on line 3—3 of Figure 1;

Figure 4 is a sectional view taken on line 4—4 of Figure 2;

Figure 5 is a sectional view taken on line 5—5 of Figure 2;

Figure 6 is a sectional view taken on line 6—6 of Figure 2;

Figure 7 is an end view;

Figure 8 is a perspective view of the photographic slide having the tape applied thereto;

Figure 9 is a detail view showing the manner in which the tape is folded over into engagement with the side surfaces of the slide;

Figure 10 is a top view of a modified form of the device;

Figure 11 is a sectional view taken on line 11—11 of Figure 10;

Figure 12 is a sectional view taken on line 12—12 of Figure 11;

Figure 13 is a sectional view taken on line 13—13 of Figure 11;

Figure 14 is a plan view of a modified form of channel into which the tape is fed from the reel; and Figure 15 is an end view from the right of Figure 14.

The embodiment of Figures 1 to 9

Referring in detail to the drawings and in particular to the form of device illustrated in Figures 1 to 9, the numeral 12 indicates generally the whole article and includes what may be called for convenience a mounting or supporting structure 14, which is in the shape of an inverted box, and similar to a table. The structure or box 14 has a top surface 16 and a depending skirt or sidewall 18. A plurality of legs 20 are secured to the structure 14 for supporting the device on a suitable supporting surface.

The top surface 16 is provided with a longitudinal slot 22 adjacent one side and positioned near one end of the device. On opposite sides of the slot 22 are downwardly depending brackets or flanges 24 extending the length of the slot. Mounted for rotation in the slot 22 is a hand wheel 26 provided with a shaft 28 (Figure 4) press-fitted in a central hole in the wheel and thereby rigidly secured therein. The wheel 26 includes an axially extending hub 30 and a wheel proper 32 extending upwardly out through the slot 22. The side flanges or brackets 24 are provided with vertical slots 34 for insertion of the shaft 28, and slots 36 are provided in the top surface 16 in register with the slots 34. The slots 34 and 36 enable withdrawal of the wheel 32 out of the top main slot 22 when the shaft 28 is without additional element secured thereto.

A roll of adhesive tape 38 is mounted on the hub 30 and includes an inner ring or core 40 for directly mounting on the hub. The reel of tape and the ring 40 are rotatable with respect to the wheel 32, but there is a degree of frictional drag between the two and the reel 38 also has frictional engagement with the side surface of the wheel proper 32.

A gear 42 is fitted on one end of the shaft 28 on the outer side of the adjacent bracket 34 and secured thereon by means of a cotter pin. The gear 42 meshes with an idler gear 44 (Figure 6) rotatably mounted on a pin 46 which is mounted in the bracket 34. The idler gear 44 in turn meshes with a third gear 48 fixedly secured to a shaft 50 by means of a cotter pin. The shaft is rotatably mounted in the brackets 34 and secured to the shaft is a knurled wheel 52 disposed between the brackets 34. The wheel 52 is mounted on the shaft 50 by a press-fit or by other equivalent means for rotation with the shaft. The shaft 50 is inserted through holes in the brackets 34 and through the knurled wheel, the latter being positioned between the brackets before insertion of the shaft. The shaft and knurled wheel are thus bodily fixed for feeding the tape out into position for applying to the photographic slides, as will be explained later.

When the gears 42 and 48 are removed from the respective shafts, the unit constituting the wheel 26 and reel of tape 38, as well as the knurled wheel 52, can be lifted out of their slots. Adjacent one end of the top main slot 22 is a downwardly curved shield or guide 58 which extends under the knurled wheel 52. The shield 58 is preferably a portion of the material cut in forming the slot 22. The free end of the tape 38, as indicated at 39, is fed under the knurled wheel 52 with the adhesive side of the tape engaging the wheel and is then brought up and extended through a channel structure indicated generally by the numeral 60.

The channel structure 60 is made up of a pair of plates 62 and 64, the plate 62 having a bottom piece 66 which is folded under and forms the base therefor. The inner portions of the plates 62 and 64 are raised from the base element 66, as indicated in Figure 5, forming a channel proper 68, and are spaced apart to form a longitudinal slot 76, which extends the full length of the channel structure 60; it should also be noted that the ends of the channel 68 are open. The inner marginal edge of the plates 62 has an upturned flange or guide 78 extending longitudinally and disposed in register with that marginal edge of the slot. The numeral 80 indicates a photographic slide inserted in the slot 76. It will be referred to again later. The plate 66 forming the base element of the channel structure extends longitudinally beyond the adjacent end of the device forming a platform indicated at 82. Immediately under the platform 82 and adjacent one side thereof is a knife 84 pivoted on a pin 86 that is mounted in the end wall of the structure. The inner end of the pin 86 is provided with a spring and nut indicated at 88 for retaining the knife taut against a spacer 90. The knife 84 is in such a position as to swing in a shearing action along the extended marginal edge of the platform 82.

The tape 39 as referred to above, after being passed under the knurled wheel 52, is fed into and through the channel 68 and brought out to the outer marginal edge of the platform 82.

To apply the tape to the slide 80, the slide is inserted into the slot 76, the guide 78 serving to retain the slide in true upright position. The edge of the slide is pressed against the tape with the outer extremity of the slide in register with the outer marginal edge of the platform 82, and in register with the end of the tape 39. After the tape is thus applied to that edge of the slide, the slide is rotated counterclockwise (Figure 3) to bring the next edge of the slide into the slot and channel, and into engagement with the tape. At the same time, the hand wheel 26 is rotated counterclockwise unreeling the tape from the reel and at the same time, acting through the gear train, rotating the knurled wheel 52. The rotation of the wheel urges the reel of tape to rotate, and rotation of the knurled wheel 52 feeds the tape up into the slot. It will be recalled that the adhesive side of the tape is in engagement with the knurled wheel and friction between the two is readily established whereby the tape is fed upwardly by the knurled wheel. Also simultaneously with turning the slide counterclockwise the slide is moved bodily to the right (Figure 3) and the second edge is brought to bear against the tape. After the last edge of the slide has had the tape applied thereto, the slide is drawn out to the right just beyond the platform 82 and a downward twisting motion is produced, shearing the tape against the edge of the platform at the edge of the slide.

If desired, the knife 84 can be used for shearing the tape but if it is not to be used, it may be left in the position shown in dotted lines (Figure 7).

After the tape is applied as above described, it is obvious that the tape lies in a plane perpendicular to the slide and it must be folded over into engagement with the side surfaces of the slide adjacent the marginal edges. For that purpose a pair of rollers embodied in an arrangement indicated in its entirety by the numeral 92 are provided. The top surface 16 is provided with an opening or aperture 94 having at its ends downturned flanges 96 (Figures 2 and 5). The rollers referred to are indicated at 98 and have mounting shafts 100 therein, the shafts being inserted in openings 102 in the flanges 96. The rollers 98 in the present instance are of metal or other non-resilient material.

The openings 102 are in the form of slots having greater transverse dimension than the diameter of the shafts to permit relative lateral movement of the rollers. The outer ends of the shafts 100 are interconnected by tension springs 104 for biasing the rollers toward each other. Below the rollers and in a vertical plane between the rollers is a stop 106, which is also mounted on the flanges 96 and welded thereto. It is to be noted that the length of the opening 94 is greater than the length of the rolls proper 98, leaving spaces between the ends of the rollers and the ends of the opening 94.

After the tape is applied to the slide, as above described, the slide is inserted between the rollers 98 and forced downwardly until it engages the stop 106 and it is inserted between rollers in such position that the end of the slide engages the end of the opening 94, i. e., it engages the flange 96 at one end and is accordingly extended beyond the adjacent end of the rollers. This position is shown in Figure 9. There is a portion of the tape indicated at 38a that is not engaged by the rollers and extends generally perpendicular to the plane of the slide, but that portion between the rollers is pressed into engagement with the side surfaces of the slide, and at the opposite end of the slide the tape is in engagement with the side surfaces of the slide. After this step has been performed, the slide is removed from between the rollers and turned a quarter turn counterclockwise and the second edge inserted downwardly between the rollers. That portion of the tape on the then bottom edge of the slide is folded upwardly and pressed into engagement with the side surfaces of the slide and that portion 38a of the tape is folded under the portion that is folded upwardly from the second edge. The procedure is continued around the periphery of the slide forming neatly folded corners of the tape as illustrated in Figure 8. Obviously in connection with the final edge, the extremity thereof is disposed between the rollers because the entire tape can be folded up at that time.

The opening 94 extends beyond the rollers on both ends thereof to accommodate the convenience of either a right-handed or left-handed operator.

The provision of the springs 104 permits the rollers to be spread apart in response to insertion of the slide therebetween, which is necessary in view of the non-resiliency of the rollers and the tension of the springs causes the rollers to firmly engage the side surface of the slide for pressing the tape against the slide.

The embodiment of figures 10 to 13

The present embodiment includes many of the features described in detail in connection with the first embodiment and emphasis in the present instance will be placed only on the differences between the two. Similar reference numerals in the present instance are employed as in the first embodiment but with prime markings.

In the present instance, the slot 22' is narrower for the purpose of receiving only the reel 38' mounted on a core 40' which is mounted on the shaft 28'. The slots 34' are provided with horizontal portions 34a. The shaft 28' is adapted to be inserted downwardly in the vertical portion of the slots and then be urged into the horizontal portion for retaining the reel in position during normal operation. The knurled wheel 52' is mounted on the shaft 50', one end of the shaft being extended for mounting in a lug 106 secured to the under side of the top surface 16'. A second knurled wheel 108 is mounted on the shaft 50' and extends upwardly through a hole 110 in the top surface 16'. There is no mechanical connection between the reel 38' and the knurled wheel 52'. Rotation of the knurled hand wheel 110 rotates the knurled wheel 52' and feeds the tape 39' into the channel 68'. In the present instance there is no knife, such as 82 in the first embodiment.

The tape 39' is fed into the channel 68' by turning the hand knurled wheel 108 and the reel 38' is rotated only in response to the tape being pulled off of the reel.

The opening 94' in the present instance is in the form of a hole having surrounding side walls 112 and a bottom floor member 114. The rollers 98' are of resilient material, such as rubber, or a rubber product, and the shafts 100' are rotatably mounted in end slots 112 but fixed bodily in position. When the slide is inserted downwardly between the rollers 98', the rollers themselves do not spread apart bodily but the portions of the rollers next adjacent each other yield and permit the slide to be inserted therebetween. In both instances, the adjacent surfaces or portions of the two rollers can be spread apart for insertion of the slide. In the one case, the rollers are non-resilient but spread bodily apart; and in the other case, the rollers are of yieldable material but are bodily fixed. The bottom wall 114 acts as a stop for limiting the desired downward movement of the slide.

In the case of the present embodiment, suction cups 116 are provided for retaining the device in fixed position when supported on a work bench or table top, and this detail of construction can also be readily incorporated in the embodiment first described.

The embodiment of Figures 14 and 15

In both of the embodiments heretofore described, the channels 68 and 68' were fixed as to width. The construction illustrated in Figures 14 and 15 is such as to be adjustable for accommodating tapes of different widths, and may be incorporated in either of the two embodiments described above. The channel itself is indicated at 68'', being partially defined by one element which includes a base portion 66'', a plate element 62'' and the guide 78''. The other element partially defining the channel is a plate 118, which is of the length corresponding to the length of the channel and provided with a pair of diagonal slots 120. Screws 122 are inserted through the slots and threaded into tapped holes in the top surface 16'. The inner edge of the plate 118 defines one side of the channel 68'' and by adjusting the plate toward and away from the other element of the channel, the channel can be adjusted as to width to accommodate tapes of different widths.

Although I have herein shown and described certain preferred embodiments of my invention, manifestly they are susceptible of modification and rearrangement of the parts without departing from the spirit and scope thereof. I do not, therefore, wish to be understood as limiting my invention to the precise forms herein disclosed, except as I may be so limited by the appended claims.

I claim as my invention:

1. In a device of the character disclosed, a mounting structure, means for mounting a reel of adhesive tape on the structure for free turning, said tape being adhesive on one side thereof, an open-ended channel on the upper surface of the structure, said channel having a longitudinal slot in its upper surface, a vertical guide integral with said channel extending upwardly from only one edge of said slot, and a roller engaging the adhesive side of the tape to unreel said tape and to feed the tape into said channel with the adhesive side of the tape facing said longitudinal slot, said slot being adapted for insertion of a photographic slide thereinto, the width of said slot being much greater than the width of said photographic slide and said guide being effective for retaining the slide in vertical position, the slide when in said slot engaging the tape in the channel whereby the tape adheres to the slide.

2. In a device of the character disclosed, a mounting structure having a top surface, an operating wheel mounted on the structure, said wheel having a hub, a reel of adhesive tape mounted on said hub, said reel being rotatable independently of said wheel but being in friction engagement therewith, said tape having adhesive on one side thereof, a roller engaging the adhesive side of the tape to unreel said tape and being adapted for feeding the unreeled tape onto said top surface, and means operably interconnecting said wheel and said roller, whereby they are rotated in the same direction.

3. In a device of the character disclosed, a mounting structure, means for mounting a reel of adhesive tape on the structure for free turning, said tape having adhesive on one side thereof, an open-ended channel on the upper surface of the structure, said channel having a longitudinal slot in its upper surface, means for varying the width of said channel, and a roller engaging the adhesive side of the tape for unreeling the tape from the reel and feeding it into said channel.

4. In a device of the character disclosed, a mounting structure, a reel of adhesive tape rotatably mounted on said structure, said mounting structure having a substantially horizontal support member adapted to have said adhesive tape fed thereover with the adhesive side of the tape facing away from said member, the unreeling tape leaving the reel of tape at a point spaced below the surface of said support member, a roller positioned between the reel and the support member adapted to engage the adhesive side of the tape at a point spaced below the surface of the support member and unreel it from the reel and feed it onto said support member, means for rotating said roller, and a guide member depending from said support member and spaced from said roller adapted to guide the segment of tape leaving said roller onto said support member.

5. In a device of the character disclosed, a mounting structure, a reel of adhesive tape rotatably mounted on said structure, said mounting structure having a support member adapted to have adhesive tape fed thereover with the adhesive side of the tape facing away from said support member, a roller positioned between the reel of tape and said support member, said tape being trained over the roller with the adhesive side of said tape in contact with said roller as the tape extends from the reel to the surface of said support member, and an arcuate guide member spaced from the roller and extending from said support member adapted to guide the segment of tape leaving said roller, onto said support member.

6. In a device of the character disclosed, a mounting structure, means on said mounting structure forming an open ended, substantially horizontal channel adapted to have adhesive tape fed therethrough, the lower side of said channel being adapted to support the adhesive tape, said adhesive tape being fed through said channel with its adhesive side facing away from the supporting side of the channel and towards the upper side of said channel, a roller adapted to engage the adhesive side of the tape and unreel it from the reel and feed it into said channel, said channel having a longitudinal slot in said upper side of width much greater than the width of a photographic slide which is to be inserted thereto, and a slide guide comprising a single flat member integral with and extending upwardly from the upper side of the channel along one edge of said longitudinal slot.

7. In a device of the character disclosed, a mounting structure, a reel of adhesive tape rotatably mounted on said structure, said mounting structure having a substantially horizontal support member adapted to have said adhesive tape fed thereover with the adhesive side of the tape facing away from said member, a rotatable feed roller positioned between the reel and the support member adapted to engage the adhesive side of the tape and unreel it from said reel and feed it onto said member, an arcuate guide member partially surrounding said roller and spaced therefrom, said guide member being so positioned with respect to the feed roller that arcuate portions of said guide member extend in opposite directions from the section thereof opposite the point on the feed roller where the tape engages said feed roller, one of said portions of the guide member being operative to guide the segment of tape leaving said roller onto said support member, and said guide member being of sufficient arcuate length such that a geometrical straight line between the edge of said support member over which the tape first passes and the edge of said guide member spaced furthest from said support member intersects said feed roller, whereby the tape is maintained at all times in contact with said feed roller.

8. In a device of the character disclosed, a mounting structure, a reel of adhesive tape rotatably mounted on said structure, said mounting structure having a substantially horizontal support member adapted to have said adhesive tape fed thereover with the adhesive side of the tape facing away from said member, a rotatable feed roller positioned between the reel and the support member adapted to engage the adhesive side of the tape and unreel it from said reel and feed it onto said support member, a guide member for the tape extending from the edge of said support member over which the tape first passes, said guide member being arcuate and partially surrounding said feed roller and being spaced therefrom to form a passageway for the tape, said guide member being of such length that a geometrical straight line between said edge of the support member and the extended end of said guide member intersects said feed roller, whereby the tape is maintained at all times in contact with said feed roller.

GEORGE W. MACK.

References Cited in the file of this patent

UNITED STATES PATENTS

| Number | Name | Date |
|---|---|---|
| 1,588,037 | Liggett | June 8, 1926 |
| 1,929,137 | Cassegrain | Oct. 3, 1933 |
| 2,165,540 | Engel | July 11, 1939 |
| 2,219,678 | Bosch | Oct. 29, 1940 |
| 2,222,611 | Freeman | Nov. 26, 1940 |
| 2,299,266 | Engel | Oct. 20, 1942 |
| 2,350,281 | Krueger et al. | May 30, 1944 |
| 2,481,704 | Werth | Sept. 13, 1949 |
| 2,496,406 | Patrick | Feb. 7, 1950 |
| 2,507,446 | Krueger | May 9, 1950 |
| 2,528,754 | Johnson | Nov. 7, 1950 |
| 2,574,332 | Krueger | Nov. 6, 1951 |